United States Patent
Choe et al.

(10) Patent No.: US 8,272,789 B2
(45) Date of Patent: Sep. 25, 2012

(54) ADAPTER ASSEMBLY AND METHOD FOR COMPENSATING OPTICAL FIBERS FOR LENGTH DIFFERENCE

(75) Inventors: Joong-Seon Choe, Daejeon (KR); Yong-Hwan Kwon, Daejeon (KR); Chun Ju Youn, Daejeon (KR); Jong-Hoi Kim, Daejeon (KR); Kwang-Seong Choi, Daejeon (KR); Eun Soo Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 223 days.

(21) Appl. No.: 12/788,237

(22) Filed: May 26, 2010

(65) Prior Publication Data

US 2011/0142398 A1     Jun. 16, 2011

(30) Foreign Application Priority Data

Dec. 15, 2009   (KR) .................. 10-2009-0124872

(51) Int. Cl.
*G02B 6/38*     (2006.01)

(52) U.S. Cl. ............... 385/60; 385/53; 385/55; 385/70; 385/73; 385/76; 385/77; 385/88; 385/89; 385/90

(58) Field of Classification Search ........... 385/53, 385/55, 56, 58, 60, 63, 70, 73, 75, 76, 77, 385/84, 88, 89, 90, 92, 139

See application file for complete search history.

(56) References Cited

U.S. PATENT DOCUMENTS

| | | | |
|---|---|---|---|
| 5,066,088 A | 11/1991 | Davies et al. | |
| 5,937,121 A * | 8/1999 | Ott et al. | 385/59 |
| 7,558,460 B2 * | 7/2009 | Yamaguchi et al. | 385/139 |
| 7,682,089 B2 * | 3/2010 | Rohlen | 385/88 |
| 2007/0014522 A1* | 1/2007 | Yamaguchi et al. | 385/88 |
| 2009/0046980 A1* | 2/2009 | Rohlen | 385/52 |
| 2011/0142308 A1* | 6/2011 | Ishikawa et al. | 382/128 |

OTHER PUBLICATIONS

J. E. Bowers et al., "Fibre-optic variable delay lines", Electronics Letters, vol. 18, No. 23, p. 999-1000 (1982).

* cited by examiner

*Primary Examiner* — Brian Healy
(74) *Attorney, Agent, or Firm* — Rabin & Berdo, P.C.

(57) ABSTRACT

Provided are an adapter assembly and method for compensating optical fibers for a length difference. The adapter assembly includes a first adapter, a second adapter, and a member. The first adapter is configured to be connected to at least one optical communication unit. The second adapter is configured to be connected to at least another optical communication unit and be coupled to the first adapter. The member is configured to be interposed between the first and second adapters for providing an optical signal transmission path between the optical communication units. Owing to the member, a length difference between optical fibers can be compensated for.

16 Claims, 5 Drawing Sheets

ADAPTER ASSEMBLY AND METHOD FOR COMPENSATING OPTICAL FIBERS FOR LENGTH DIFFERENCE

CROSS-REFERENCE TO RELATED APPLICATIONS

This U.S. non-provisional patent application claims priority under 35 U.S.C. §119 of Korean Patent Application No. 10-2009-0124872, filed on Dec. 15, 2009, the entire contents of which are hereby incorporated by reference.

BACKGROUND

The present invention disclosed herein relates to an adapter assembly, and more particularly, to an adapter assembly and method for compensating optical fibers for a length difference.

In a general method for transmitting a signal through optical fibers, connectors such as FC or SC connectors are attached to ends of optical fibers, and the connectors are coupled by using adaptors. When it is desired to change the length of an optical fiber, a part of the optical fiber is cut. However, due to a connector attached to the optical fiber, it is technically not easy to cut the optical fiber precisely. For example, in the case where two optical fibers are connected to a signal detector, precise signal detection may be difficult if there is a length difference between the two optical fibers.

SUMMARY

The present invention provides an adapter assembly and method for compensating optical fibers for a length difference.

The adapter assembly may be used to compensate for an optical signal transmission path difference caused by an optical fiber length difference.

Embodiments of the present invention provide adapter assemblies including: a first adapter configured to be connected to at least one optical communication unit; a second adapter configured to be connected to at least another optical communication unit and be coupled to the first adapter; and a member interposed between the first and second adapters for providing an optical signal transmission path between the optical communication units.

In some embodiments, the member may include an optical fiber configured to provide the optical signal transmission path.

In other embodiments, the first and second adapters may have first and second widths, respectively, in a length direction of the optical fiber, and the optical fiber may have a length equal to or different from the sum of the first and second widths.

In still other embodiments, the member may further include a third adapter disposed between the first and second adapters, the third adapter comprising a space into which the optical fiber is inserted.

In even other embodiments, the third adapter may have a third width in a length direction of the optical fiber, and the optical fiber may have a length equal to the third width.

In yet other embodiments, the first to third adapters may be screw-coupled to each other.

In other embodiments of the present invention, adapter assemblies include: a first adapter including a first hollow part; a second adapter including a second hollow part and coupled to the first adapter so that the second hollow part is connected to the first hollow part; an intermediate member disposed between the first and second adapters for providing an optical communication transmission path; and a third adapter including a third hollow part configured to receive the intermediate member, the third adapter being disposed between the first and second adapters so that the third hollow part is connected to the first and second hollow parts.

In some embodiments, the adapter assemblies may further include a sleeve inserted in the first to third hollow parts that is connected to each other.

In other embodiments, the first adapter may further include a tube-shaped first connection part including a hollow part configured to be coupled with a first connector, the first connector including a first ferrule inserted in the first hollow part and a first optical fiber inserted in the first ferrule; and wherein the intermediate member may include a third optical fiber connected to the first optical fiber for providing an optical signal transmission path so as to compensate for an optical signal transmission path difference varying according to a length of the first optical fiber.

In still other embodiments, the second adapter may further include a tube-shaped second connection part including a hollow part configured to be coupled with a second connector, the second connector including a second ferrule inserted in the second hollow part and a second optical fiber inserted in the second ferrule; and wherein the intermediate member may include a third optical fiber connected to the second optical fiber for providing an optical signal transmission path so as to compensate for an optical signal transmission path difference varying according to a length of the second optical fiber.

In still other embodiments of the present invention, adapter assemblies include: a first adapter including a first hollow part; a second adapter including a second hollow part and coupled to the first adapter so that the second hollow part is connected to the first hollow part; and an intermediate member inserted in the first and second hollow parts for providing an optical communication transmission path.

In some embodiments, one of the first and second adapters may be connected to an optical fiber, and the intermediate member may provide an optical signal transmission path for the optical fiber so that an optical signal transmission path difference varying according to a length of the optical fiber is compensated for.

In other embodiments, a detector may be connected to the other of the first and second adapters for detecting an optical signal, and the intermediate member may provide an optical signal transmission path between the optical fiber and the detector.

In still other embodiments, the adapter assemblies may further include a sleeve inserted in the first and second hollow parts, wherein the intermediate member may be inserted in the sleeve.

In even other embodiments of the present invention, there are provided methods for compensating for an optical signal transmission path difference, the methods including: connecting a first optical fiber having a first length to an optical communication device for optical communication therebetween; and connecting a second optical fiber having a second length different from the first length to the optical communication device for optical communication therebetween, wherein at least one of the first and second optical fibers is coupled with the above-described adapter assembly so as to compensate for an optical signal transmission path difference varying according to a difference between the first and second lengths.

In some embodiments, the connecting of the first optical fiber may include: coupling the first optical fiber to a first connector by inserting the first optical fiber into a first ferrule of the first connector; and connecting the first connector to the optical communication device for optical communication therebetween.

In other embodiments, the connecting of the second optical fiber may include: coupling the second optical fiber to a second connector by inserting the second optical fiber into a second ferrule of the second connector; and connecting the second connector to the optical communication device for optical communication therebetween.

In still other embodiments, the first length may be greater than the second length by a length (L), and the adapter assembly may have a size corresponding to the length (L) so that the optical signal transmission path difference caused by the difference between the first and second lengths is compensated for.

In even other embodiments, at least one of the first and second optical fibers may be coupled with the above-described adapter assembly by: coupling the first connector to a first adapter assembly including a member having a third length, and connecting the first adapter assembly to the optical communication device for optical communication therebetween; and coupling the second connector to a second adapter assembly including a member having a fourth length different from the third length, and connecting the second adapter assembly to the optical communication device for optical communication therebetween In yet other embodiments, the first length may be greater than the second length by a length (L1), and the fourth length may be greater than the third length by a length (L1) so that the optical signal transmission path difference caused by the difference between the first and second lengths is compensated for.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF EMBODIMENTS

Figure 1:
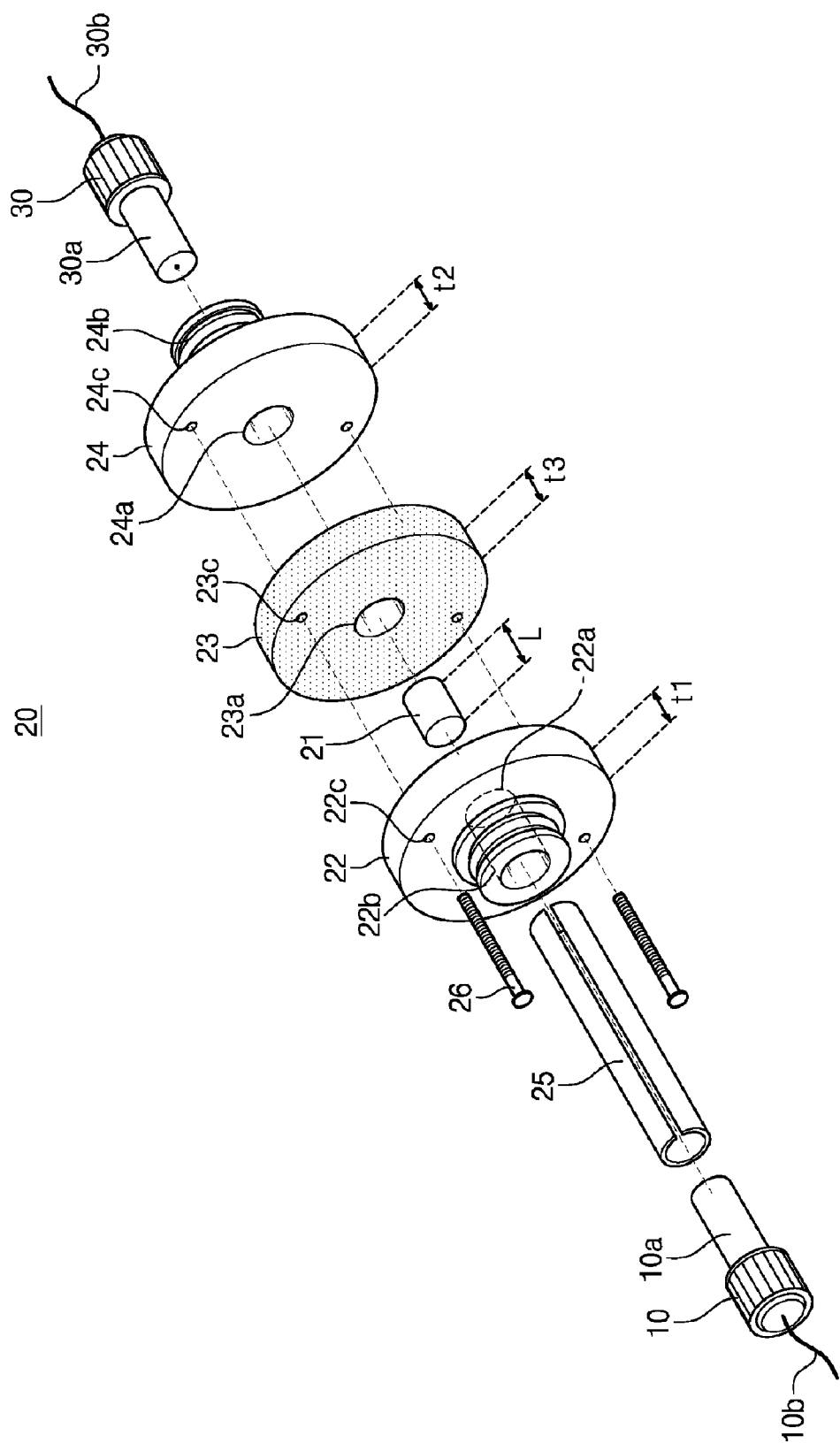
FIG. 1 is an exploded perspective view illustrating an adapter assembly according to an embodiment of the present invention.

An adapter assembly and method for compensating optical fibers for a length difference will now be described with reference to the accompanying drawings according to exemplary embodiments of the present invention.

The present invention will be clearly understood from the detailed description, the accompanying drawings, and the claims. Particularly, the scope of the present invention is clearly pointed out and claimed through the claims. In the drawings, like reference numerals refer to like elements.

FIG. 1 is an exploded perspective view illustrating an adapter assembly according to an embodiment of the present invention.

Referring to FIG. 1, the adapter assembly 20 may be physically connected to at least one optical communication unit, for example, first and second connectors 10 and 30 for optical communication between the first and second connectors 10 and 30. The connectors 10 and 30 may be optical communication connectors such as FC connectors, PC connectors, SC connectors, ST connectors, and LC connectors. For example, the first connector 10 may be an optical connector including a first ferrule 10a, which is physically connected to the adapter assembly 20 and coupled with a first optical fiber 10b by inserting the first optical fiber 10b into the first ferrule 10a. Similarly, the second connector 30 may be an optical connector including a second ferrule 30a, which is physically connected to the adapter assembly 20 and coupled with a second optical fiber 30b by inserting the second optical fiber 30b into the second ferrule 30a. The first and second connectors 10 and 30 may have equal or similar structures and sizes.

The adapter assembly 20 may include a first adapter 22 to which the first connector 10 may be connected, a second adapter 24 to which the second connector 30 may be connected, and a third adapter 23 disposed between the first adapter 22 and the second adapter 24. The first and second adapters 22 and 24 may have equal or similar shapes, and the third adapter 23 may have a shape suitable for being sandwiched between the first and second adapters 22 and 24.

For example, the first adapter 22 may have a ring structure, in which a tube-shaped first connection part 22b having a hollow part is disposed at one side for coupling with the first connector 10, and a first hollow part 22a is disposed at a center part for connection with the hollow part of the first connection part 22b. The outer surface of the first connection part 22b may be threaded. The first hollow part 22a may have a circular shape. The first ferrule 10a of the first connector 10 may be inserted into the first connection part 22b and extended through the first hollow part 22a.

Similarly, the second adapter 24 may have a ring structure, in which a tube-shaped second connection part 24b having a hollow part is disposed at a side opposite to the first adapter 22 for coupling with the second connector 30, and a second hollow part 24a is disposed at a center part for connection with the hollow part of the second connection part 24b. The outer surface of the second connection part 24b may be threaded. The second ferrule 30a of the second connector 30 may be inserted into the second connection part 24b and extended through the second hollow part 24a. The second hollow part 24a may have a circular shape having a diameter equal or similar to that of the first hollow part 22a, and the second hollow part 24a may be connected to the first hollow part 22a.

Like the first adapter 22 and/or the second adapter 24, the third adapter 23 may have a ring shape with a central third hollow part 23a. The central third hollow part 23a may be connected to the first hollow part 22a and the second hollow part 24a.

Alternatively, the first to third adapters 22, 24, and 23 may have the same shape or different shapes, selected from an elliptical shape and polygonal shapes such as a rectangular shape. Similarly, the first to third hollow parts 22a, 24a, and 23a may have the same shape or different shapes, selected from an elliptical shape and polygonal shapes such as a rectangular shape.

The first to third adapters 22, 24, and 23 may be screw-coupled with each other. For example, the first adapter 22 may have at least one screw hole 22c. Similarly, the second adapter 24 may have at least one screw hole 24c, and the third adapter 23 may have at least one screw hole 23c. The first to third adapters 22, 24, and 23 may be coupled with each other physically and firmly by fastening screws 26 to the screw holes 22c, 24c, and 23c.

The adapter assembly 20 may include a sleeve 25 insertable through the first to third adapters 22, 24, and 23, and an intermediate member 21 insertable through the sleeve 25. The sleeve 25 may have a shape such as a tube shape with a hollow part so as to be inserted through the first to third hollow parts 22a, 24a, and 23a of the first to third adapters 22, 24, and 23. The first ferrule 10a may be inserted into an end of the sleeve 25, and the second ferrule 30a may be inserted into the other end of the sleeve 25.

The intermediate member 21 may be designed for the following purpose: in a state where the intermediate member 21 is inserted in the sleeve 25, one end of the intermediate member 21 makes contact with the first ferrule 10a for optical communication with the first optical fiber 10b, and the other end of the intermediate member 21 makes contact with the second ferrule 30a for optical communication with the second optical fiber 30b. For example, the intermediate member 21 may include an optical fiber to provide a transmission path of optical signals. Like the first ferrule 10a and/or the second ferrule 30a, the intermediate member 21 may have a cylindrical shape. The intermediate member 21 may have a length (L) equal or similar to the thickness (t3) of the third adapter 23. As one embodiment, the intermediate member 21 may function as an optical delay line (ODL).

According to one embodiment, owing to the intermediate member 21, a length difference of optical fibers can be substantially compensated for. The length (L) of the intermediate member 21 and/or the thickness (t3) of the third adapter 23 may be adjusted so as to compensate optical fibers for a length difference. The sizes of the first adapter 22 and the second adapter 24 may be previously given.

Intermediate members 21 having various lengths, and third adapters 23 having various thicknesses may be prepared. Then, if two optical fibers have different lengths, an intermediate member 21 having a length (L) corresponding to the length difference, and a third adapter 23 having a thickness (t3) corresponding to the length difference may be connected between the given first and second adapters 22 and 24 so as to constitute the adapter assembly 20.

According to one embodiment, the third adapter 23 may not be coupled to the adapter assembly 20. For example, the first ferrule 10a of the first connector 10 may have a length which cannot reach the first hollow part 22a of the first adapter 22, and the second ferrule 30a of the second connector 30 may have a length which cannot reach the second hollow part 24a of the second adapter 24. In this case, the length (L) of the intermediate member 21 may be smaller than the sum of the thickness (t1) of the first adapter 22 and the thickness (t2) of the second adapter 24. That is, the first and second adapters 22 and 24 may be screw-coupled to each other so as to connect the first hollow part 22a and the second hollow part 24a directly, and the intermediate member 21 may be inserted in the connected first and second hollow parts 22a and 24a so that both ends of the intermediate member 21 can be connected to the first and second ferrules 10a and 30a, respectively. In another example, the length (L) of the intermediate member 21 may be equal to or greater than the sum of the thickness (t1) of the first adapter 22 and the thickness (t2) of the second adapter 24. In this case, the lengths of the first and second ferrule 10a and 30a may be changed.

As well as the adapter assembly 20 connects the two connectors 10 and 30 physically, the adapter assembly 20 compensates optical fibers for a length difference. For example, in a signal detection method such as an Optical Coherent Detection method, it may be require that a plurality of optical signals arrive at a detector at the same time through a plurality of optical fibers. For simultaneous arrival of optical signals, generally, the length difference of optical fibers may be kept smaller than several millimeters (mm). For example, it may be required that the skew of a 100-Gbps optical device be kept at 5 ps or lower, which is corresponding to 1 mm or less length of an optical fiber. Allowable length difference of optical fibers may be varied according to data transmission rates. If the lengths of optical fibers become different while connectors are coupled to the optical fibers, the length difference can be compensated for by using the adapter assembly 20 of the embodiment of the present invention.

Figure 2A:
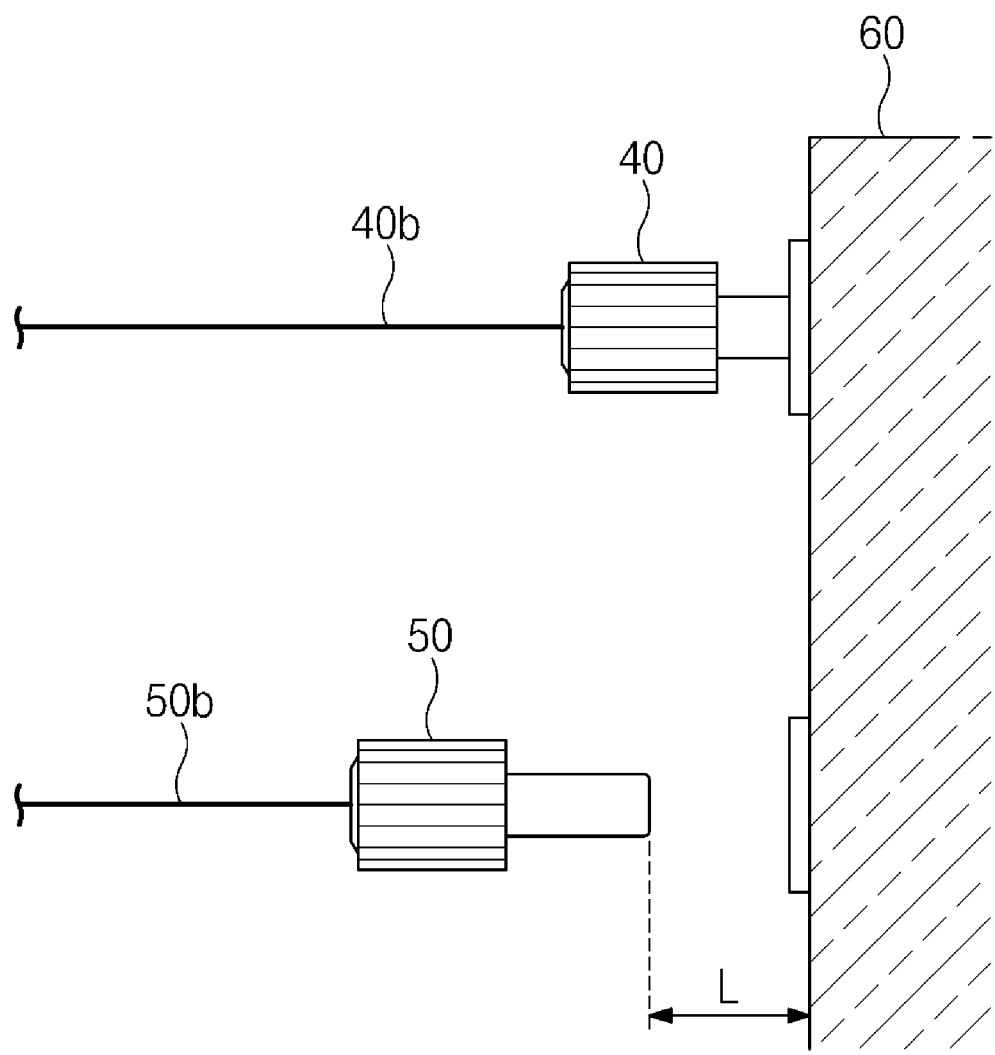
FIGS. 2A and 2B are plan views for explaining a method for compensating optical fibers for a length difference by using an adapter assembly according to an embodiment of the present invention.
Figure 2B:
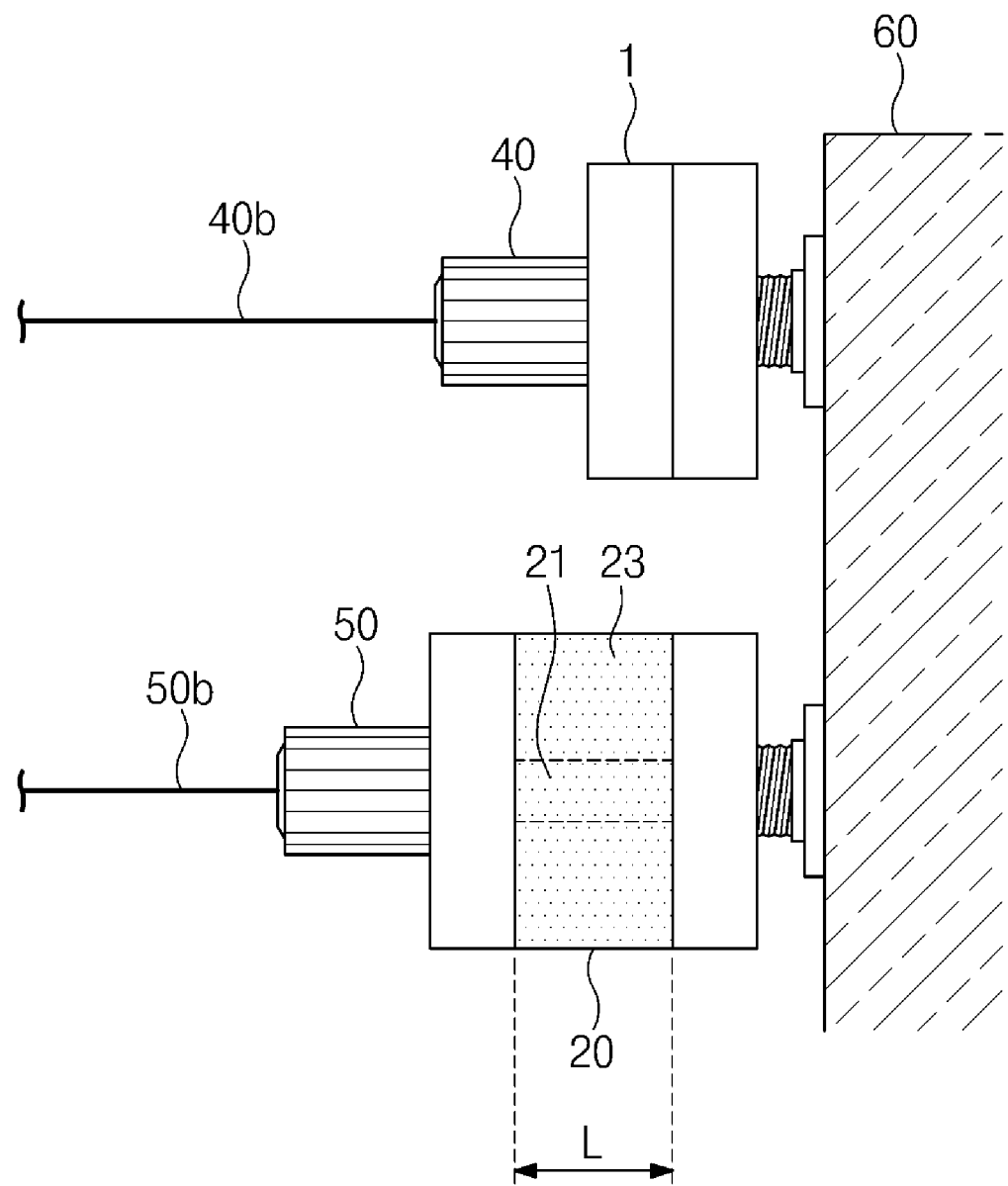

FIGS. 2A and 2B are plan views for explaining a method for compensating optical fibers for a length difference by using an adapter assembly according to an embodiment of the present invention. In the embodiment, optical fibers are compensated for their length difference by coupling an adapter assembly of the present invention to one of the optical fibers having different lengths.

FIG. 2A illustrates an exemplary case for connecting a detector 60 with a connector 40 coupled to a relatively long optical fiber 40b and a connector 50 coupled to a relatively short optical fiber 50b. In the case shown in FIG. 2A, it is assumed that the length difference of the optical fibers 40b and 50b is (L). Referring to FIG. 2B, the connector 40 coupled to the long optical fiber 40b may be connected to the detector 60 through an adapter assembly 1 which is not configured according to the present invention, and the connector 50 coupled to the short optical fiber 50b may be connected to the detector 60 through an adapter assembly 20 which is configured according to the present invention. In this case, the adapter assembly 20 may include a third adapter 23 having a thickness corresponding to the length difference (L), and an intermediate member 21 having a length corresponding to the length difference (L). Therefore, substantially, the length of the short optical fiber 50b can be increased by the length difference (L) to elongate an optical signal path. As a result, the length difference (L) can be compensated for, and thus optical signal transmission distances of the optical fibers 40b and 50b may become equal to each other or may be reduced within an allowable error range.

Figure 3A:
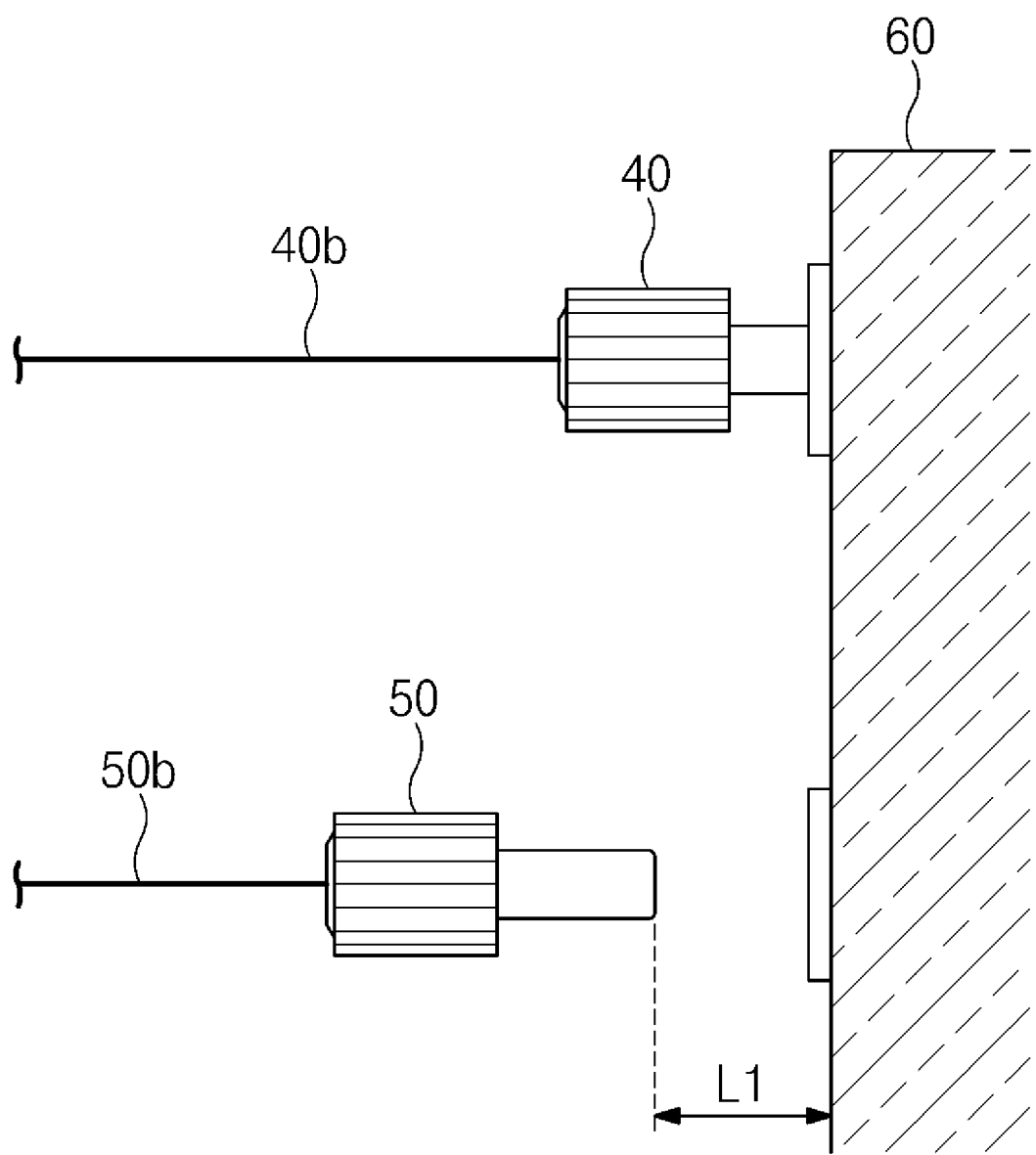
FIGS. 3A and 3B are plan views for explaining a method for compensating optical fibers for a length difference by using adapter assemblies according to a modified embodiment.
Figure 3B:
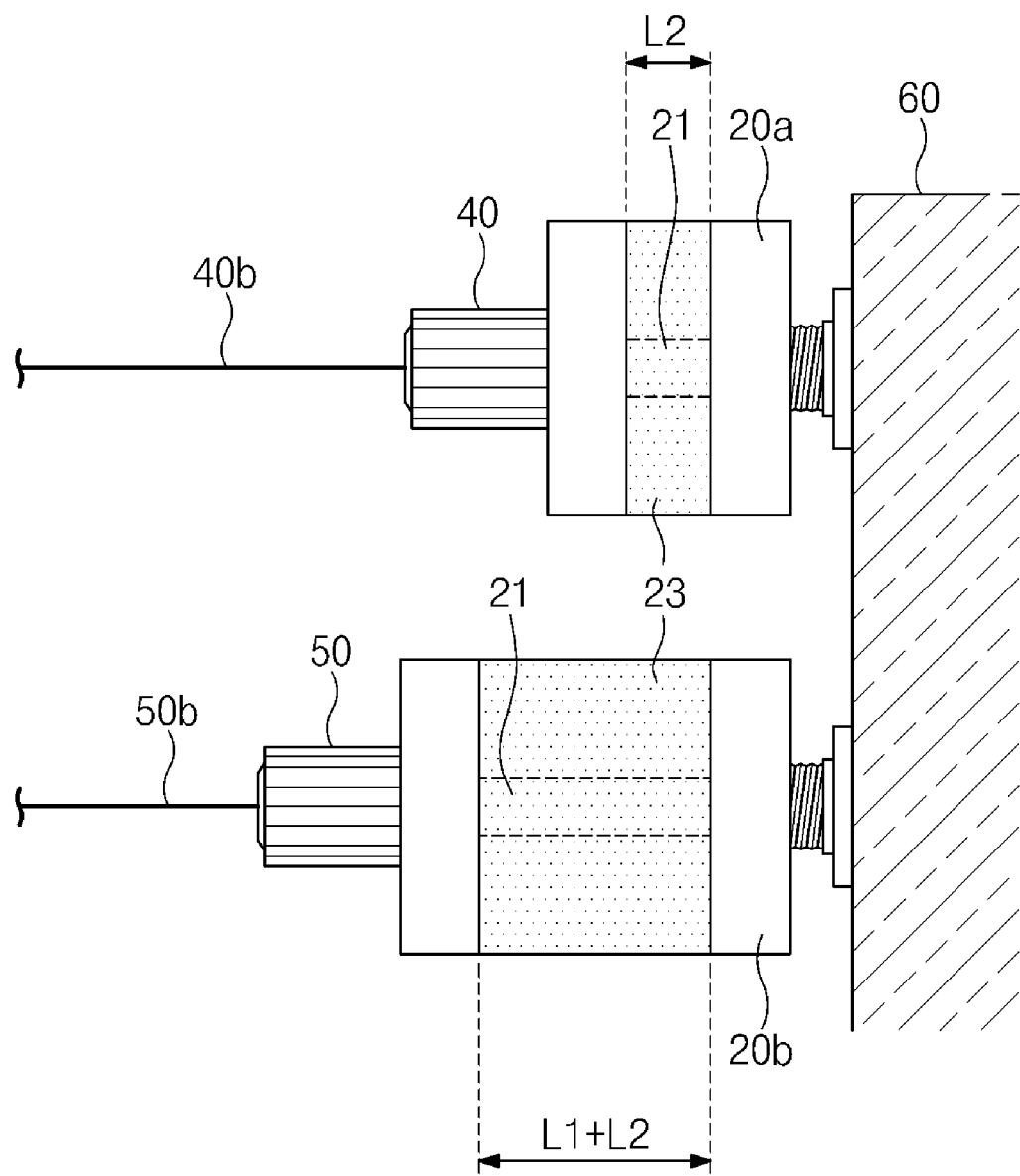

FIGS. 3A and 3B are plan views for explaining a method for compensating optical fibers for a length difference by using adapter assemblies according to a modified embodiment. In the modified embodiment, optical fibers are compensated for their length difference by coupling adapter assemblies of the present invention to both the optical fibers having different lengths.

FIG. 3A illustrates an exemplary case for connecting a detector 60 with a connector 40 coupled to a relatively long optical fiber 40b and a connector 50 coupled to an optical fiber 50b which is shorter than the long optical fiber 40b by a length (L1). Referring to FIG. 3B, the connector 40 coupled to the long optical fiber 40b may be connected to the detector 60 through an adapter assembly 20a including an intermediate member 21 having a length (L2) and a third adapter 23 having a width (L2). The connector 50 coupled to the short optical fiber 50b may be connected to the detector 60 through an adapter assembly 20b including an intermediate member 21 having a length (L1+L2) and a third adapter 23 having a width (L1+L2). Therefore, the length difference (L1) between the optical fibers 40b and 50b can be compensated for by the length difference (L1) between the adapter assemblies 20a and 20b.

According to the present invention, an adapter assembly is used to compensate for a length difference that may exist between optical fibers. Therefore, optical components can be easily manufactured with lower costs. In addition, as compared with methods of adjusting the length of an optical fiber by using an ODL or slicing an optical fiber, a method of using the adapter assembly of the present invention is simpler and more cost-effective. Moreover, the adapter assembly of the present invention can be used for various optical communication systems.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An adapter assembly comprising:
    a first adapter configured to be connected to at least one optical communication unit;
    a second adapter configured to be connected to at least another optical communication unit and be coupled to the first adapter; and
    a member interposed between the first and second adapters for providing an optical signal transmission path between the optical communication units,
    wherein the member comprises an optical fiber configured to provide the optical signal transmission path, and
    wherein the first and second adapters have first and second widths, respectively, in a length direction of the optical fiber, and the optical fiber has a length equal to or different from the sum of the first and second widths.

2. The adapter assembly of claim 1, wherein the member further comprises a third adapter disposed between the first and second adapters, the third adapter comprising a space into which the optical fiber is inserted.

3. The adapter assembly of claim 2, wherein the third adapter has a third width in a length direction of the optical fiber, and the optical fiber has a length equal to the third width.

4. The adapter assembly of claim 2, wherein the first to third adapters are screw-coupled to each other.

5. An adapter assembly comprising:
    a first adapter comprising a first hollow part;
    a second adapter comprising a second hollow part and coupled to the first adapter so that the second hollow part is connected to the first hollow part;
    an intermediate member disposed between the first and second adapters for providing an optical communication transmission path; and
    a third adapter comprising a third hollow part configured to receive the intermediate member, the third adapter being disposed between the first and second adapters so that the third hollow part is connected to the first and second hollow parts,
    wherein the first adapter further comprises a tube-shaped first connection part comprising a hollow part configured to be coupled with a first connector, the first connector comprising a first ferrule inserted in the first hollow part and a first optical fiber inserted in the first ferrule; and
    wherein the intermediate member comprises a third optical fiber connected to the first optical fiber for providing an optical signal transmission path so as to compensate for an optical signal transmission path difference varying according to a length of the first optical fiber.

6. The adapter assembly of claim 5, further comprising a sleeve inserted in the first to third hollow parts that are connected to each other.

7. The adapter assembly of claim 5, wherein the second adapter further comprises a tube-shaped second connection part comprising a hollow part configured to be coupled with a second connector, the second connector comprising a second ferrule inserted in the second hollow part and a second optical fiber inserted in the second ferrule; and
    wherein the intermediate member comprises a third optical fiber connected to the second optical fiber for providing an optical signal transmission path so as to compensate for an optical signal transmission path difference varying according to a length of the second optical fiber.

8. An adapter assembly comprising:
    a first adapter comprising a first hollow part;
    a second adapter comprising a second hollow part and coupled to the first adapter so that the second hollow part is connected to the first hollow part; and
    an intermediate member inserted in the first and second hollow parts for providing an optical communication transmission path,
    wherein one of the first and second adapters is connected to an optical fiber, and the intermediate member provides an optical signal transmission path for the optical fiber so that an optical signal transmission path difference varying according to a length of the optical fiber is compensated for.

9. The adapter assembly of claim 8, wherein a detector is connected to the other of the first and second adapters for detecting an optical signal, and the intermediate member provides an optical signal transmission path between the optical fiber and the detector.

10. The adapter assembly of claim 8, further comprising a sleeve inserted in the first and second hollow parts, wherein the intermediate member is inserted in the sleeve.

11. A method for compensating for an optical signal transmission path difference, the method comprising:
    connecting a first optical fiber having a first length to an optical communication device for optical communication therebetween; and
    connecting a second optical fiber having a second length different from the first length to the optical communication device for optical communication therebetween,
    wherein at least one of the first and second optical fibers is coupled with an adapter assembly so as to compensate for an optical signal transmission path difference varying according to a difference between the first and second lengths, the adapter assembly including:
        a first adapter configured to be connected to at least one optical communication unit;
        a second adapter configured to be connected to at least another optical communication unit and be coupled to the first adapter; and
        a member interposed between the first and second adapters for providing an optical signal transmission path between the optical communication units.

12. The method of claim 11, wherein the connecting of the first optical fiber comprises:
    coupling the first optical fiber to a first connector by inserting the first optical fiber into a first ferrule of the first connector; and
    connecting the first connector to the optical communication device for optical communication therebetween.

13. The method of claim 12, wherein the connecting of the second optical fiber comprises:
coupling the second optical fiber to a second connector by inserting the second optical fiber into a second ferrule of the second connector; and
connecting the second connector to the optical communication device for optical communication therebetween.

14. The method of claim 13, wherein the first length is greater than the second length by a length (L), and the adapter assembly has a size corresponding to the length (L) so that the optical signal transmission path difference caused by the difference between the first and second lengths is compensated for.

15. The method of claim 13, wherein at least one of the first and second optical fibers is coupled with the adapter assembly of claim 1 by:
coupling the first connector to a first adapter assembly comprising a member having a third length, and connecting the first adapter assembly to the optical communication device for optical communication therebetween; and
coupling the second connector to a second adapter assembly comprising a member having a fourth length different from the third length, and connecting the second adapter assembly to the optical communication device for optical communication therebetween 16. The method of claim 15, wherein the first length is greater than the second length by a length (L1), and the fourth length is greater than the third length by a length (L1) so that the optical signal transmission path difference caused by the difference between the first and second lengths is compensated for.

* * * * *